United States Patent Office 3,264,351
Patented August 2, 1966

3,264,351
1,4-DIAMINOBICYCLO[2.2.2]OCTANES
Leslie G. Humber, Montreal, Quebec, Canada, assignor to American Home Products Corporation, New York, N.Y., a corporation of Delaware
No Drawing. Filed July 8, 1964, Ser. No. 381,236
2 Claims. (Cl. 260—570.5)

This invention relates to new derivatives of bicyclo[2.2.2]octane and to a process for their preparation. More particularly, my invention relates to bicyclo[2.2.2]octanes containing aralkylamino substituents in bridgehead positions and to the syntheses of new intermediates in the preparation of said compounds of my invention, which possess valuable pharmacological properties.

The new pharmacologically active compounds of this invention, in base form, may be represented by the Formula I:

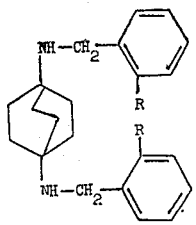

(I)

wherein R is a halogen atom of atomic weight less than 80.

These compounds are basic in nature and form acid addition salts. Such salts with pharmacologically acceptable acids are biologically equivalent to the free bases and constitute a preferred form for the administration of the pharmacologically active compounds of this invention.

The bicyclo[2.2.2]octane derivatives of this invention, both as their free bases and as salts with pharmacologically acceptable acids, are useful as antibacterial and as cholesterol lowering agents, and may be administered orally or by injection in the form of tablets, capsules, or solutions, or topically in the form of lotions, creams, or powders.

The new compounds of this invention may be conveniently prepared from bicyclo[2.2.2]octane-1,4-dicarboxamide (Lukes and Langthater, Coll. Czech. Chem. Comm., 24, 2109 (1959)) as shown:

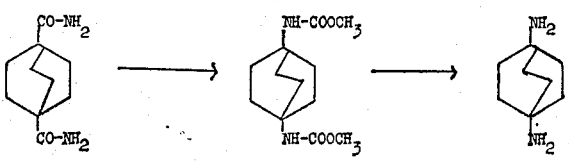

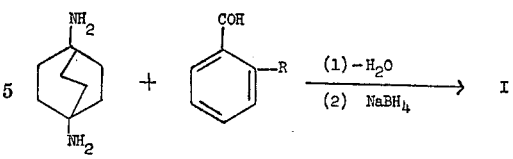

wherein R has the same significance as defined above. The following examples are illustrative of my invention.

*Example 1.—Dimethyl bicyclo-[2.2.2]-octane-1,4-dicarbamate*

A solution of sodium methoxide in methanol (600 ml.) prepared from 22.5 gm. of sodium (0.97 mole), and bromine (30 ml., 0.58 mole) was added alternately, in small portions, to a refluxing mixture of bicyclo-[2.2.2]-octane-1,4-dicarboxamide (10 gm., 0.05 mole) in methanol (100 ml.). The addition tooks 3 hours, then the reaction mixture was filtered hot, evaporated to dryness in vacuo and the residue triturated with water. The remaining solid was crystallized from methanol to yield the product, M.P. 166–168°.

Elemental analysis confirmed the empirical formula $C_{12}H_{20}N_2O_4$.

*Example 2.—1,4-diaminobicyclo-[2.2.2]-octane*

Dimethyl bicyclo-[2.2.2]-octane-1,4-dicarbamate (8.5 gm.) and concentrated hydrochloric acid (100 ml.) were refluxed for 17 hours. The acid was removed in vacuo and the residue crystallized from methanol-ether to yield the title product as the dihydrochloride salt, M.P. >310°.

Elemental analysis confirmed the empirical formula $C_8H_{18}Cl_2N_2$.

The free base obtained from the dihydrochloride has M.P. 83–85°.

*Example 3.—1,4-bis-(o-chlorobenzylamino)-bicyclo-[2.2.2]-octane*

1,4-diaminobicyclo-[2.2.2]-octane (2.5 gm.) and o-chlorobenzaldehyde (5.0 gm.) were converted to the bis-Schiff base by refluxing in benzene (100 ml.) for two hours. It was obtained crystalline from a benzene-hexane mixture and had M.P. 170–175° (5.1 gm.). The Schiff base was reduced with sodium borohydride (8.0 gm.) in methanol (50 ml.) to yield the product as a solid, M.P. 95–97°. The dihydrochloride salt had M.P. >310° (MeOH-ether).

Elemental analysis confirmed the empirical formula $C_{22}H_{28}Cl_4N_2$.

I claim:
1. 1,4-bis-(o-chlorobenzylamino)-bicyclo-[2.2.2]-octane.
2. The dihydrochloride salt of 1,4-bis-(o-chlorobenzylamino)-bicyclo-[2.2.2]-octane.

No references cited.

CHARLES B. PARKER, *Primary Examiner.*

ROBERT V. HINES, *Assistant Examiner.*